(No Model.) 2 Sheets—Sheet 1.
H. WYMAN.
STOP MECHANISM FOR LOOMS.
No. 438,591. Patented Oct. 14, 1890.
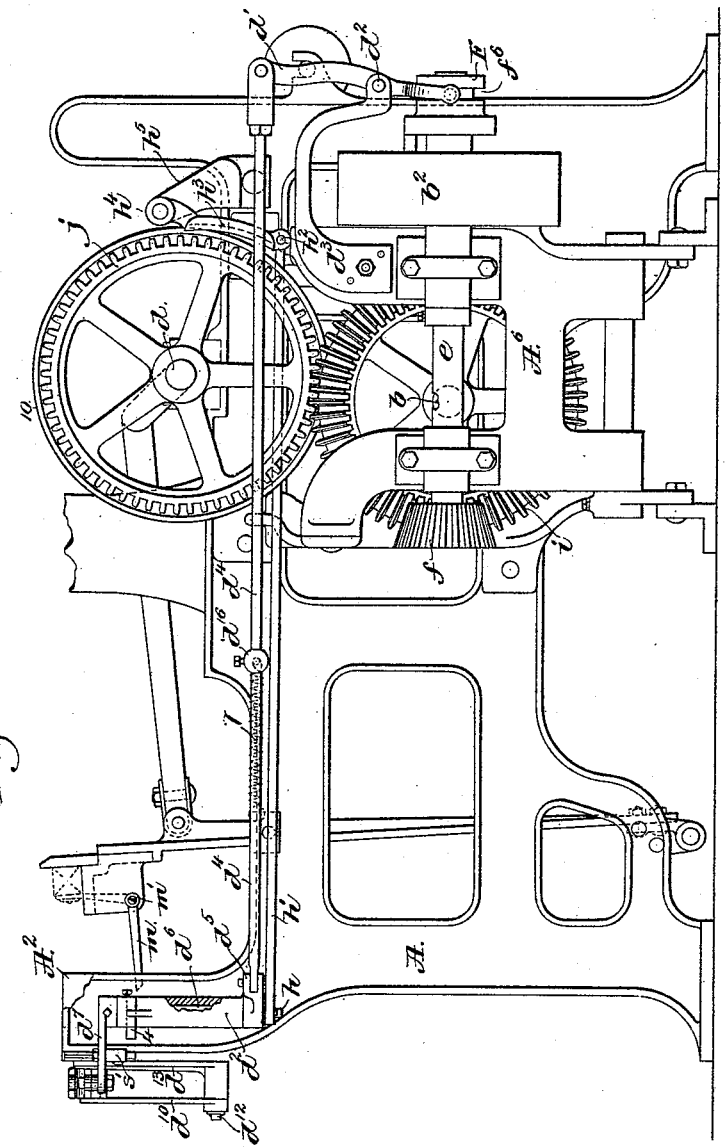
Witnesses.
Frederick L. Emery
Edgar A. Godkin
Inventor.
Horace Wyman,
by Crosby & Gregory
Attys

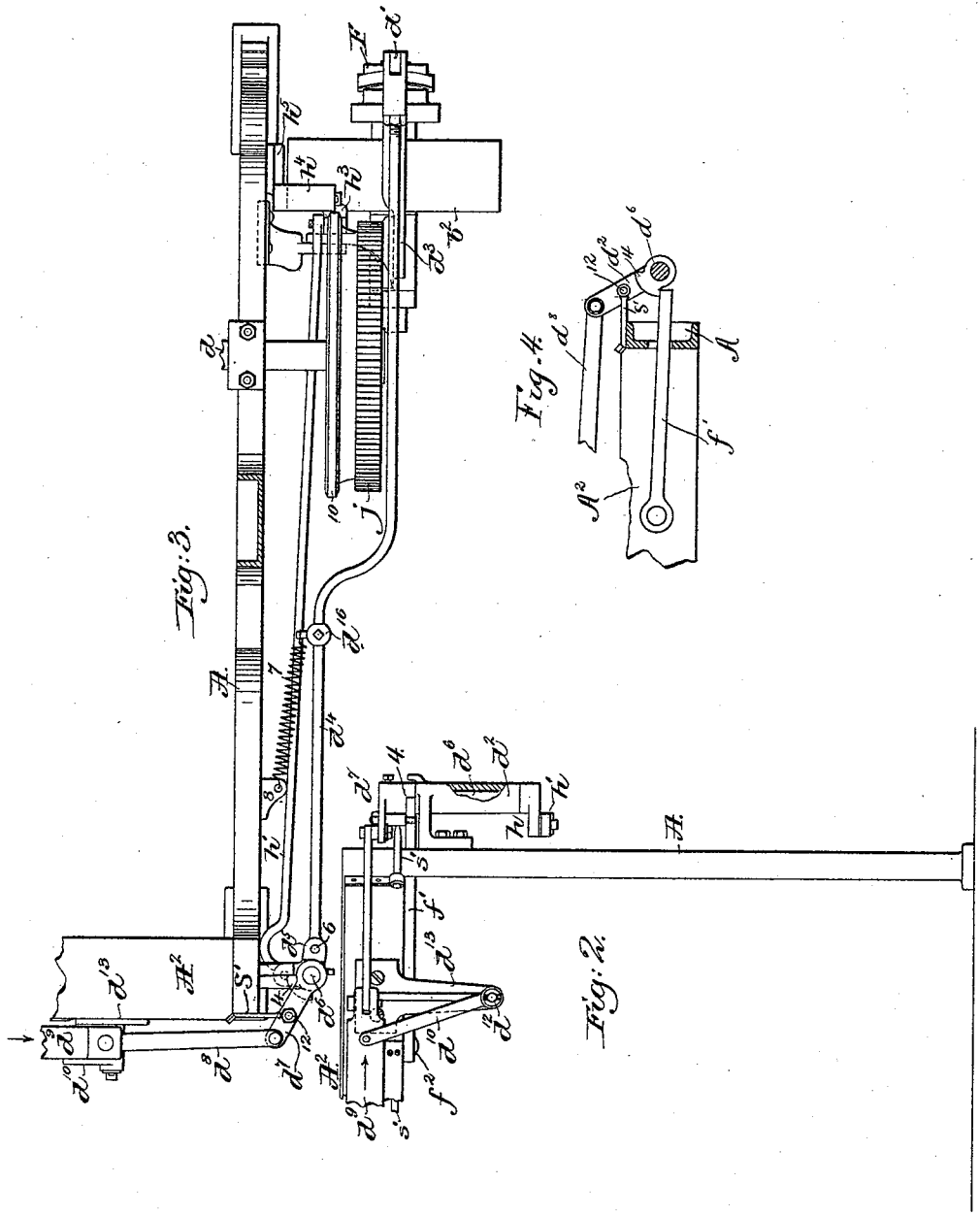

UNITED STATES PATENT OFFICE.

HORACE WYMAN, OF WORCESTER, MASSACHUSETTS, ASSIGNOR TO THE CROMPTON LOOM WORKS, OF SAME PLACE.

STOP MECHANISM FOR LOOMS.

SPECIFICATION forming part of Letters Patent No. 438,591, dated October 14, 1890.

Application filed March 27, 1890. Serial No. 345,533. (No model.)

*To all whom it may concern:*

Be it known that I, HORACE WYMAN, of Worcester, county of Worcester, State of Massachusetts, have invented an Improvement in Stop Mechanisms for Looms, of which the following description, in connection with the accompanying drawings, is a specification, like letters and figures on the drawings representing like parts.

This invention has for its object to provide a loom in which the power to drive it is transmitted through a friction or clutch pulley, with means whereby the said friction or clutch pulley will have its parts automatically disengaged to stop the loom whenever the weft fails or the shuttle is not properly boxed. To do this I have combined with the loom a short vertical rock-shaft connected by a connecting-rod to a clutch-moving lever. I have also connected to the said rock-shaft a second connecting-rod attached to a brake which is automatically applied to a brake-wheel when the friction or clutch pulley parts are separated. The said vertical rock-shaft has also connected to it a hand-rail by which the operator may open or separate the parts of the friction or clutch pulley at will by hand from the front of the loom.

The particular features in which my invention consists will be hereinafter described, and set forth in the claims at the end of this specification.

Figure 1 in side elevation represents a sufficient portion of an ordinary loom with my improvements added to enable my invention to be understood. Fig. 2 is a partial front elevation of the loom near the right-hand side thereof; Fig. 3, a partial top or plan view of the right-hand side of the loom, the said figure including part of the breast-beam; and Fig. 4 is a detail showing the lever $f'$ attached to the under side of the breast-beam.

The loom-frame A, the crank-shaft $d$, the gear $j$ thereon, the gear $i$ engaged by it and fast on the lower cross or picking shaft $b$, the end of which is shown mostly in dotted lines in Fig. 1, the bevel-gear $f$, the pulley-shaft $e$, and the rod $s'$ are and may be all as usual in power-looms, as, for instance, in United States Patent No. 265,659. The pulley $b^2$, loose on the said shaft and adapted to be embraced and rotated by any usual belt, and the clutch sleeve or hub F at one side of the pulley and splined loosely to the said shaft, so that it may be slid thereon when it is desired to stop or start the shaft $e$, are and may be all as in United States Patent No. 363,507, May 24, 1887, to which reference may be had; but it is not intended to limit this invention to only the friction or clutch pulley shown, as many well-known equivalent forms of pulley may be employed instead.

To actuate the sleeve F of the friction or clutch pulley at the proper times, I have provided a lever $d'$, forked at its lower end or having a pin to enter a groove $f^6$ on the said sleeve, the lever being pivoted at $d^2$ upon a stand $d^3$, secured to the stand $A^6$ at the loom side, said stand having bearings for the shaft $e$. The upper end of the lever $d'$ has joined to it a rod $d^4$, the forward end of which is joined to an arm $d^5$ at the lower end of a vertical rock-shaft $d^6$, held in a suitable sleeve-like bearing $d^2$, supported at one end of the loom near the breast-beam $A^2$. The drawings show the vertical rock-shaft and rod $d^4$ in position to engage one part of the friction or clutch pulley with the other part, as when the loom is running regularly, and in Fig. 3 it will be seen that the joint 6 between the rod $d^4$ and the arm $d^5$ is so located with relation to the center of the vertical rock-shaft to compel the said shaft to remain in such position until again positively rocked, the spring 7, connected to the collar $d^{16}$, and the lug 8 aiding in keeping the said joint 6 past or across the center and retaining the rock-shaft in the position shown in Fig. 2, or at one side or across its center. The rock-shaft $d^6$ at its upper end has an arm $d^7$, which is jointed by a link $d^8$ to one end of a shipper or hand-rail $d^9$, preferably of wood, and extended across the loom in front of the breast-beam, the said rail being accessible by the operator in any position in front of the loom, so that he may stop or start the loom as desired; but one end of the rail $d^9$ is herein shown, but both ends are supported in like manner, as by a link $d^{10}$, pivoted at $d^{12}$, on a leg $d^{13}$, connected to the breast-beam, there being such a leg and link to support each end of the said bar. The rock-shaft $d^6$ at its lower end is provided with a third arm or projection, as $h$, which is jointed to one end of a brake-rod $h'$, jointed at $h^2$ to a brake $h^3$, pivoted at $h^4$ on a stand $h^5$, the junction of the rods $d^4$ and $h'$ with the said arms of the said rock-shaft being such that when the rock-shaft $d^6$ is turned to effect the engagement of the friction-pulley the brake will not engage the brake-wheel 10 connected to the wheel $j$, and vice versa. Whenever the hand-bar $d^9$ is moved in the direction of the arrows in Figs. 2 and 3 the vertical rock-shaft $d^6$ is moved in such direction as to move the pivot 6 toward the loom side and cause the rod $d^4$ to draw the upper end of the lever $d'$ toward the loom-frame and effect the release of the loose pulley $b^2$. The stop-rod $s'$ is common to United States Patent No. 265,659, dated October 10, 1882, where it is designated by like letters. This rod $s'$, jointed at 12 to the arm $d^7$ of the rock-shaft $d^6$, will in practice on the failure of the weft be moved automatically to the right, viewing Fig. 2, by or through any usual weft-feeler and connections—such, for instance, as shown in United States Patent No. 364,163, dated May 31, 1887—referred to, the said parts not shown containing an elbow-lever adapted to act upon a collar on the said rod $s'$ to move it to the right, viewing Fig. 2, whenever the weft fails to thus turn the said rock-shaft and stop the loom. The rock-shaft $d^6$ also has upon it an arm or projection 4, which, when the loom is running properly, stands close to one end of a lever $f'$, pivoted at $f^2$ at the under side of the breast-beam, the said lever being acted upon by a dagger $m$ on the dagger-shaft $m'$, having a vertical arm to bear against the usual shuttle-binder, the absence of a shuttle from the usual shuttle-box when one should be present therein permitting the dagger to rise, strike the lever $f'$ and cause it to act on the arm 4 and turn the vertical rock-shaft $d^6$ to effect the release of the belt-pulley $B'$, as described, to stop the loom.

I claim—

1. The pulley-shaft, a pulley loose thereon, a co-operating clutch sleeve or hub on the said shaft, and a lever to move it, and the vertical rock-shaft having the arm $d^5$ and projection 4, and a rod to connect the said lever and arm $d^5$, combined with the lever $f'$, the lay, and the dagger, to operate substantially as described.

2. The vertical rock-shaft having arms $d^7$ and $d^5$ and projection 4, the rod $d^4$ and lever $d'$, the pulley-shaft, the loose pulley thereon, and the clutch-sleeve to move it, combined with means to turn the said vertical rock-shaft, and the spring 7, it operating to hold the said shaft, substantially as described.

3. The pulley-shaft, a pulley loose thereon, a co-operating sleeve or hub on the said shaft to rotate said pulley at times, a lever to move the hub, a vertical rock-shaft having arms $d^5$ and $h$, and a projection 4, and the crank-shaft, the brake-wheel, the brake, the rod $d^4$ to connect the hub-moving lever and arm $d^5$, and the rod $h'$ to connect the projection $h$ with the said brake, combined with the lever $f'$, the lay, and the dagger to turn the rock-shaft, free the loose pulley, and put on the brake, substantially as described.

4. The vertical shaft $d^6$, having the projection 4, combined with the lever $f'$, pivoted below the breast-beam, the lay, and the dagger-shaft, and dagger, to operate substantially as described.

5. The vertical rock-shaft provided with arms $d^7$ $d^5$ and projection 4, the rods $s'$ and $d^4$, the pulley-shaft, a loose pulley thereon, and sliding sleeve or hub, combined with means intermediate the said rod $d^4$ and sleeve or hub, and with the lever $f'$, and means to actuate the latter, substantially as described.

In testimony whereof I have signed my name to this specification, in the presence of two subscribing witnesses.

HORACE WYMAN.

Witnesses:
GEO. W. GREGORY,
EMMA J. BENNETT.